April 10, 1928. 1,665,441
H. BRUSCH
AUTOMOBILE
Filed Aug. 16, 1925 2 Sheets-Sheet 1
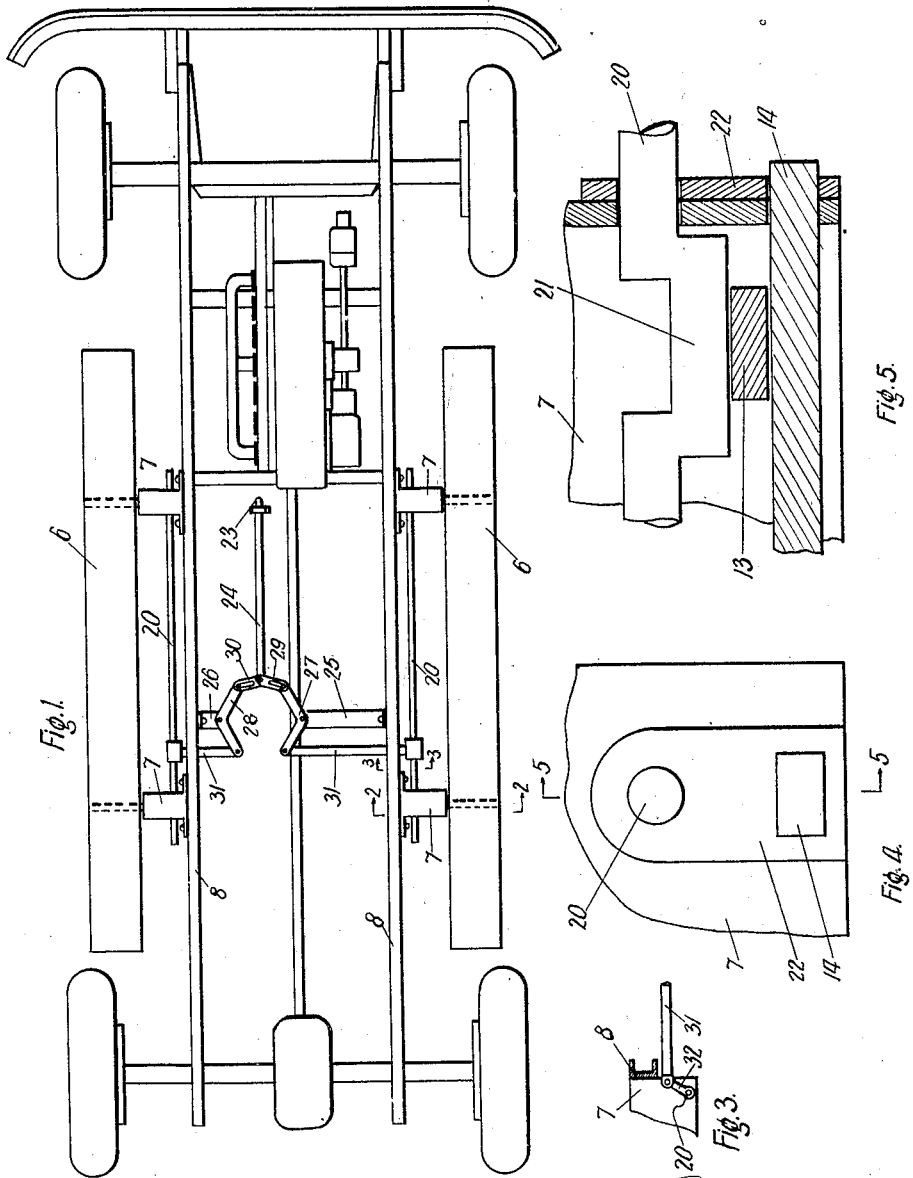
Helmuth Brusch INVENTOR.
BY Erich H. Michaelis ATTORNEY.

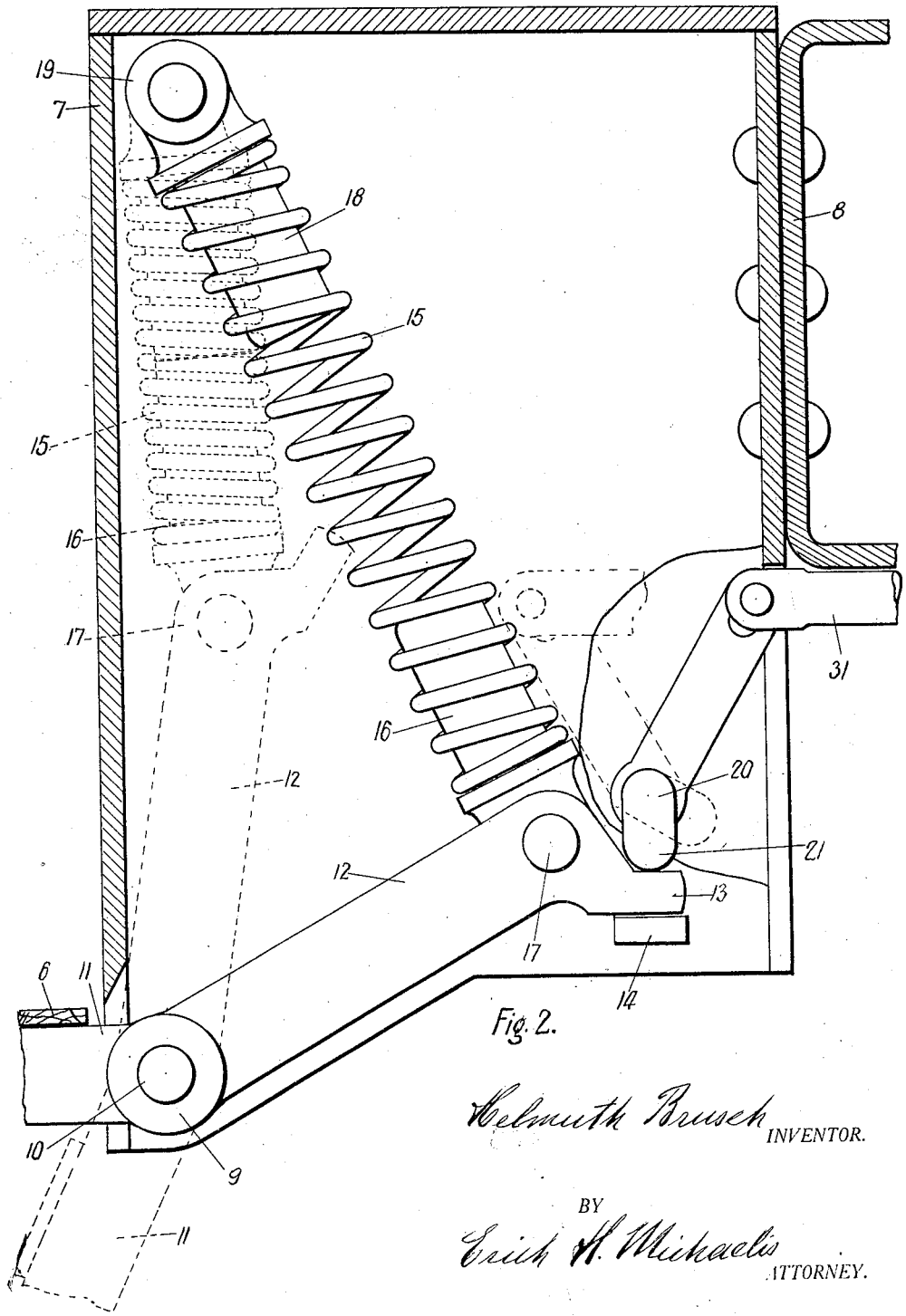

Patented Apr. 10, 1928.

1,665,441

UNITED STATES PATENT OFFICE.

HELMUTH BRUSCH, OF CHICAGO, ILLINOIS.

AUTOMOBILE.

Application filed August 16, 1926. Serial No. 129,304.

The invention relates to automobiles. More especially it relates to collapsible running boards for automobiles.

Lately it has happened very often, that a robber, hold-up man, or the like has jumped upon the running board of an automobile and has forced the people riding in said automobile to hand over their valuables, often in addition thereto compelling the owner of the automobile to leave the car in the possession of the bandit.

The object of the invention is to provide means for enabling the driver of an automobile to protect himself and his passengers against the above explained danger, without running the greater risk of getting shot.

More especially the object of the invention is to equip the automobile in such a manner, that the driver may at will dump a person standing on the running board of the automobile from said board without having to stop the car.

Another object of the invention is to provide the car with a running board usually held rigidly in the position normally occupied by running boards, but adapted to be released so as to be pivoted downwardly by the weight of a person standing thereon, thereby dumping said person off said running board.

A further object of the invention is to provide a running board hingedly or pivotally connected to an automobile, and to provide means adapted to be controlled by the driver of said automobile for securing the running board in the position normal to such boards, or for releasing said board from such position, whereby a person standing on said board would be dumped therefrom.

Other objects of the invention not specifically mentioned will be easily ascertained and understood from the following description in connection with the accompanying drawings forming a part thereof.

In the drawings:

Fig. 1 is a top view of an automobile, the body thereof being omitted, the chassis and the parts connected therewith being diagrammatically shown.

Fig. 2 is a section on line 2—2 of Fig. 1.

Fig. 3 is a section on line 3—3 of Fig. 1.

Fig. 4 is a partial end view of the box fastened to the frame of the automobile and containing and supporting a part of the mechanism constituting the invention, and Fig. 5 is a section on line 5—5 of Fig. 4.

To support the running board 6 boxes 7 are fastened on the side parts 8 of the frame of the automobile. A bell crank lever 9 is pivotally mounted on a short shaft or pin 10 extending through and supported by the end walls of box 7. The arms 11 and 12 respectively of the bell crank 9 are extending to each other at an obtuse angle, as shown in Fig. 2. The arm 11 extends outwardly of said box 7, and the running board 6 is fastened to said arm. As shown in the drawings two boxes 7 are fastened to each lateral part 8 of the frame of the automobile, but seeing that all said boxes are of similar construction, and that all parts connected to and supported by or contained in said boxes are alike and similarly arranged, only one such unit is here described. It is however to be noted, that the present invention is not to be limited to the exact number of units or to the exact construction thereof shown in the drawings and described in the specification, but that such changes and alterations may be made as fall in the scope of the claims appended hereto.

The other arm 12 of the bell crank 9 extends inwardly of the box 7 and is provided at its inner end with a stop lug 13. A wedge 14 extends through openings provided therefor in the end walls of the box 7, and a spring 15 normally forces the arm 12 downwardly, so that the lug 13 abuts the wedge 14. When the arm 12 is in this position, the other arm 11 extends horizontally of the box 7 thereby supporting the running board 6 in the position usually occupied by such boards.

In order to be adapted to force the bell crank lever 9 into said position the spring 15 is arranged as follows: A plug 16 is pivotally connected by means of a pin 17 with the arm 12 and the one end of the spring surrounds said plug. A similar plug 18 is pivotally mounted on a pin 19 extending through and supported by the end walls of the box 7. Said pin is arranged adjacent the upper outer edge of the box. When a person would step on a running board constructed as described above, the weight of said person would overcome the strength of the spring 15, and the bell crank lever 9 would be pivoted about the pin 10, so that it would get into the position shown in dotted lines in Fig. 2. The spring would be compressed and would be in the position also shown in dotted lines in Fig. 2. Thereby the person on the running board would be dumped therefrom.

In order to secure the bell crank lever 9 and the running board 6 in the position shown in full lines in Fig. 2, or, in other words, in order to prevent said board from swinging downward every time a person wants to enter the automobile, means are provided for locking the bell crank lever in its normal position.

A shaft 20 is provided with lugs, cranks, or eccentric portions 21 adapted to engage the stop lug 13 of the arm 12 of the bell crank lever 9. Normally the shaft 20 is in the position shown in full lines in Fig. 2. In this position the eccentric portion 21 engages the upper face of the lug 13 and prevents the arm 11 and the running board 6 from swinging downwardly.

In case a robber, hold-up man, or the like jumps onto the running board, the shaft 20 will be rotated in such a manner, that the eccentric portion 21 will get into the position shown in dotted lines in Fig. 2. Thereby the bell crank lever will be released to swing downwardly under the weight of the bandit standing on the running board, and this person will be dumped from said board. In this way the collapsible running board will protect the driver and the passengers of the automobile.

The shaft 20 is journaled in the end walls of the boxes 7. In order to strengthen said end walls reinforcing pieces 22 are welded or fastened in any suitable manner to the outside of said walls. Said reinforcing pieces are provided with openings registering with the openings in the end walls of the boxes, so that the shaft 20 and the wedges 14 may be supported also by said reinforcing pieces. The eccentric portions 21 are located inside the boxes between the end walls thereof.

In order to enable the driver to position the eccentric portion at will, a pedal lever 23 is provided near the driver's seat. A rod 24 is connected to said pedal lever in such a manner, that the rod will be moved forwardly in relation to the automobile, when the pedal lever is actuated. Brackets 25 and 26 respectively are fastened to the lateral parts 8 of the automobile frame and extend inwardly thereof. Bell crank levers 27 and 28 are pivotally mounted on the brackets 25 and 26 respectively adjacent the inner ends thereof. Connecting levers 29 and 30 are pivotally connected to the rod 24 with one of their ends. The other end of lever 29 is slidably and pivotally connected to bell crank 27, and the free end of lever 30 is connected in the same manner to bell crank 28. A push rod 31 is pivotally connected to the free end of each of said bell cranks. A lever arm is rigidly mounted on the shaft 20, and the free end of said lever arm is pivotally connected with the push rod 31.

In case of an attempted hold-up the driver needs only to actuate the pedal lever 23, whereby the shaft 20 will be rotated by means of the parts described above, thereby releasing the stop lug 13 from their engagement with the eccentric portion 21 and dumping the bandit from the running board.

As soon as the weight is removed from the running board the springs 15 will return the bell crank levers 9 and the running board 6 to their normal position shown in full lines in Fig. 2.

A well known spring (not shown) may be provided to return the pedal lever and all parts connected therewith into their normal position, whereby the eccentric portions 21 will again engage the stop lugs 13 securing the running board in its normal position.

What I claim as new and desire to secure by Letters Patent is:

1. On an automobile a running board, a plurality of bell crank levers supporting said board and pivotally mounted on said automobile, a shaft rotatably mounted on said automobile, eccentric portions on said shaft as means for securing the bell cranks in supporting position and for releasing the same.

2. On an automobile a running board, a plurality of bell cranks supporting said board and pivotally mounted on said automobile, a shaft rotatably mounted on said automobile, eccentric portions on said shaft adapted to engage and lock said bell cranks against pivotal movement, and means controlled by the driver of the automobile for rotating said shaft and bringing said eccentric portions into and out of bell crank locking position.

3. On an automobile a running board, a plurality of bell cranks supporting said board and pivotally fastened to the automobile, a shaft rotatably mounted on said automobile, means on said shaft for locking said bell cranks against pivotal movement, a lever on said automobile, and means connecting said lever with said shaft for bringing the locking means on said shaft into and out of bell crank locking position.

In witness whereof I have affixed my signature hereto.

HELMUTH BRUSCH.